P. M. DICKEY, Jr.
Hydrant-Cocks.
No. 156,777.
Patented Nov. 10, 1874.
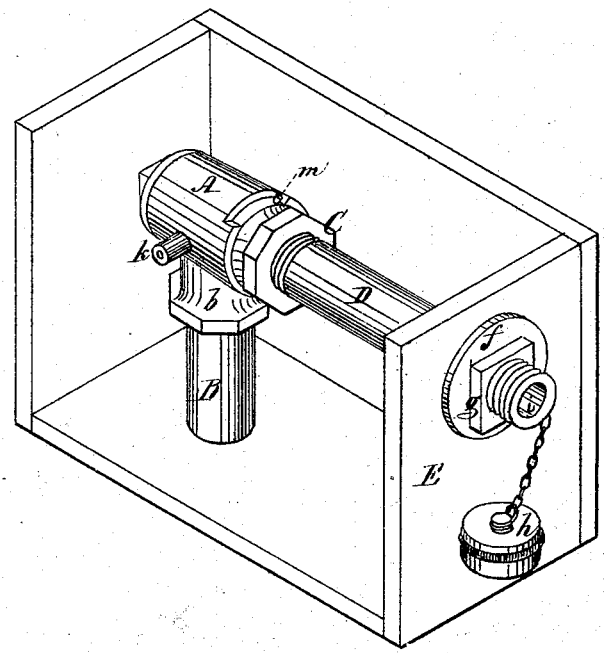
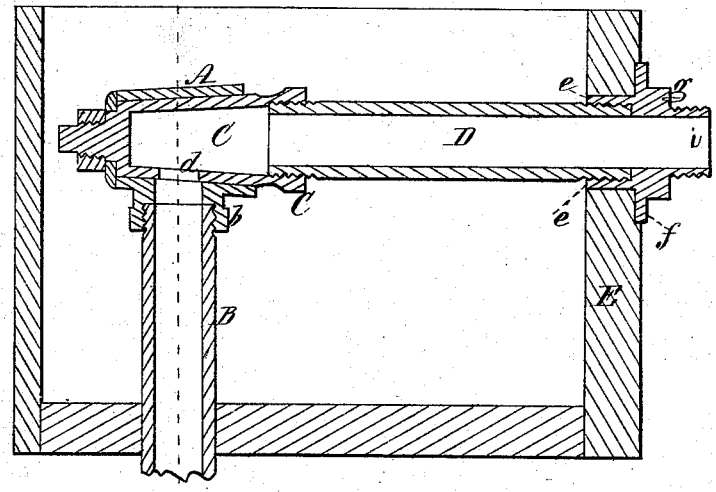
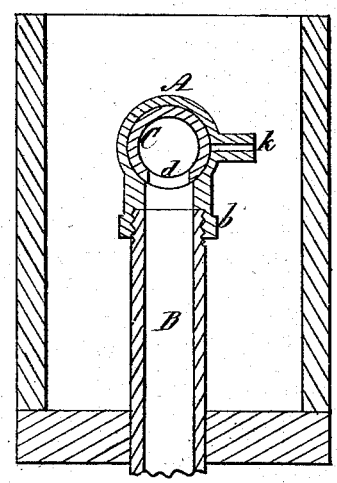

UNITED STATES PATENT OFFICE.

PETER M. DICKEY, JR., OF MEDFORD, MASSACHUSETTS.

IMPROVEMENT IN HYDRANT-COCKS.

Specification forming part of Letters Patent No. 156,777, dated November 10, 1874; application filed July 28, 1874.

*To all whom it may concern:*

Be it known that I, PETER M. DICKEY, Jr., of Medford, in the county of Middlesex and State of Massachusetts, have invented an Improved Hydrant-Cock, of which the following is a full, clear, and exact description, reference being had to the accompanying drawings, making part of this specification, in which—

Figure 1 is a perspective view of my improved hydrant-cock. Fig. 2 is a longitudinal vertical section through the same. Fig. 3 is a transverse vertical section through the same on the line $x\,x$ of Fig. 2.

Where hand-hose is used for washing windows, sidewalks, &c., a pipe usually extends through the wall of the house, outside of which it is provided with a screw-thread, to which the hose-coupling is attached, the end of the pipe being covered by a screw-cap when the hose is removed. With this arrangement, when it is desired to let on or shut off the water, it becomes necessary to go into the cellar and turn the stop-cock, which is inconvenient, and consumes considerable time; and when the hydrant is situated in a garden or in a stable, where the pipe to which the hose is attached extends up to the surface of the ground or floor, the water is let on or shut off by a long iron rod, provided at its top with a cross-bar, and connected with the stop-cock below. This construction is, however, expensive.

My invention has for its object to overcome these difficulties, and to enable the water to be let on or shut off by simply turning the pipe with which the hose is connected, thus avoiding the necessity of going into the cellar, or using a long rod, as above described; and my invention consists in a stop cock provided with a hollow plug, one end of which is open, and has attached to it the pipe to which the hose is connected, the pipe forming a prolongation of the plug, and communicating directly therewith, the water being admitted to the hollow plug, when the latter is turned, by means of the pipe, into a position to bring an opening in its side opposite to the supply-pipe.

To enable others skilled in the art to understand and use my invention, I will proceed to describe the manner in which I have carried it out.

In the said drawings, A represents the shell of the cock, which is provided with a branch, $b$, to which the service-pipe B is attached. C is the plug, which is hollow, and has an opening, $d$, through which the water is admitted into it from the pipe B. The outer end of the plug is open, and is provided with a screw-thread, into which is fitted the threaded end of a pipe, D, which forms a prolongation of the plug, and communicates therewith. This pipe extends out to the wall E of the house, where it has attached to it a short piece, $e$, which extends through the wall, and is furnished outside thereof with a flange, $f$, and a square head, $g$, to which a wrench may be applied, in order to turn the pipe D and plug C to let on or shut off the water. The hose-coupling is attached directly to the outer end of the piece $e$, which is provided with a screw-thread, and when the hose is removed the end of the pipe is covered by a cap, $h$.

When the hydrant is placed in a stable or garden, the parts are so arranged that the pipe D will extend vertically up through the floor, or to the surface of the ground, into a convenient position to admit of the hose being attached thereto.

In shutting off the water the plug C is turned a quarter of a revolution, which brings the opening $d$ in its side opposite to the waste-outlet $k$, by which means the pipe D and plug are emptied, the motion of the plug being limited by a stop-pin, $m$, in a well-known manner.

From the foregoing it will be seen that, when it is desired to let on or shut off the water, it is merely necessary to turn on its axis the pipe D with which the hose is connected, which can be done from the outside of the building, or from the surface of the floor or ground, without removing the hose, if desired; and the necessity of going into the cellar to turn the stop-cock, or using a long iron rod connected with a stop-cock below, is thus entirely avoided—a convenience which will be readily appreciated.

I am aware that it is not new in hydrants to interpose a valve or cock between the supply-pipe and exit-pipe, so that by turning the latter water may be admitted or shut off, as desired. In all such cases heretofore known the outer end of the outlet-pipe has been formed with a bend or elbow, which extends at right angles therewith, and whenever it is necessary to admit the water this bend or elbow must be turned around from its normal position. With my invention I employ a flanged nut provided with a square or polygonal shaped head, and an exterior screw-head, so that the valve may be opened or closed, and the hose attached directly thereto, without a change in position of the parts.

What I claim as my invention, and desire to secure by Letters Patent, is—

The flanged nut $e\ f\ g\ i$, in combination with the pipe D for opening and closing the valve, substantially as set forth.

Witness my hand this 24th day of July, A. D. 1874.

PETER M. DICKEY, Jr.

In presence of—
P. E. TESCHEMACHER,
W. J. CAMBRIDGE.